April 19, 1927.  
H. C. BENNIE  
TRICYCLE  
Filed Aug. 30, 1926  
1,624,915  
3 Sheets-Sheet 1

H. C. Bennie  
Inventor

April 19, 1927.

H. C. BENNIE

TRICYCLE

Filed Aug. 30, 1926

H. C. Bennie
Inventor
By C. A. Snow & Co.
Attorneys.

April 19, 1927.
H. C. BENNIE
TRICYCLE
Filed Aug. 30, 1926
1,624,915
3 Sheets-Sheet 3
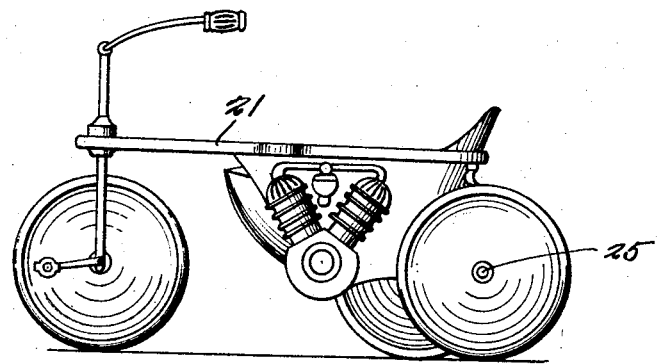
Fig. 7.
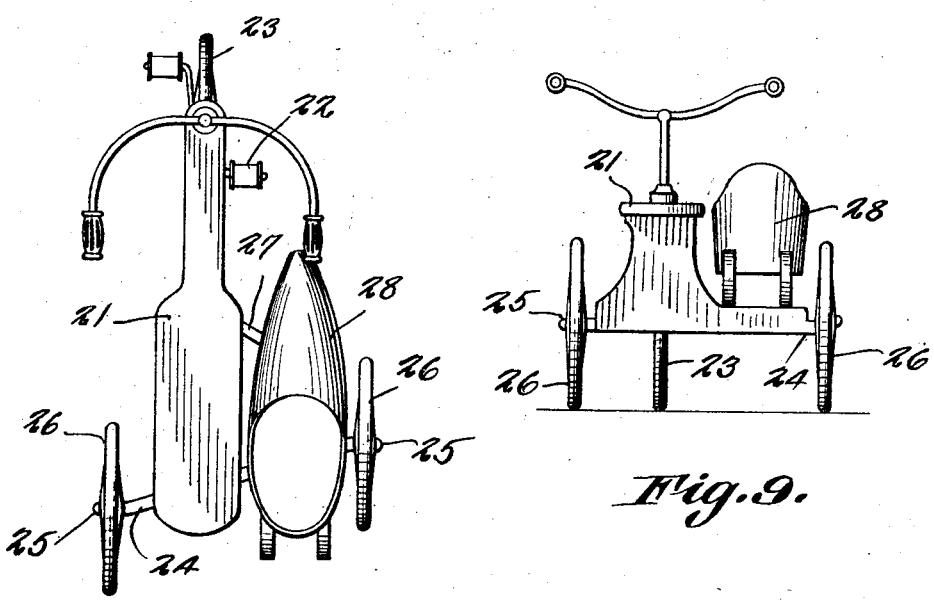
Fig. 8.
Fig. 9.
H. C. Bennie
Inventor
By C. A. Snow & Co.
Attorneys.

Patented Apr. 19, 1927.

1,624,915

UNITED STATES PATENT OFFICE.

HAROLD C. BENNIE, OF ALMENA, KANSAS.

TRICYCLE.

Application filed August 30, 1926. Serial No. 132,570.

This invention relates to children's vehicles, such as velocipedes or the like, the primary object of the invention being to provide a device of this character wherein the wheels at the rear of the body portion of the vehicle are offset with respect to each other to increase the speed thereof, and eliminate to a degree, the chances of the vehicle turning over.

A further object of the invention is to provide a frame so constructed that a side car may be supported thereon, the vehicle simulating the usual motorcycle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 7 is an elevational view of the opposite side of the vehicle.

Figure 8 is a plan view thereof.

Figure 9 is a rear elevational view of a modified form of the vehicle.

Figure 1:
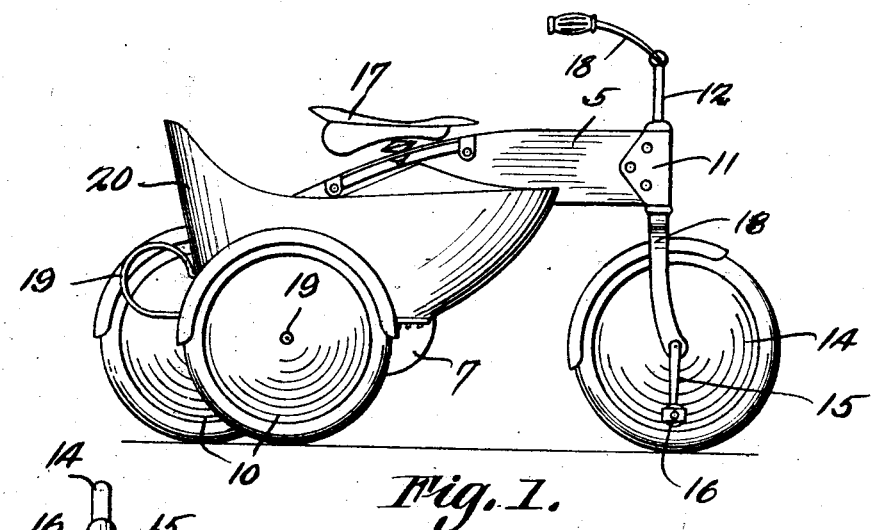
Figure 1 is a side elevational view of a vehicle constructed in accordance with the invention.

Referring to the drawings in detail, the vehicle includes a frame embodying a main bar 5 having an enlarged portion 6, the lower edge thereof being curved at 7 simulating the crank casing of a motorcycle engine.

Figures 2, 3:
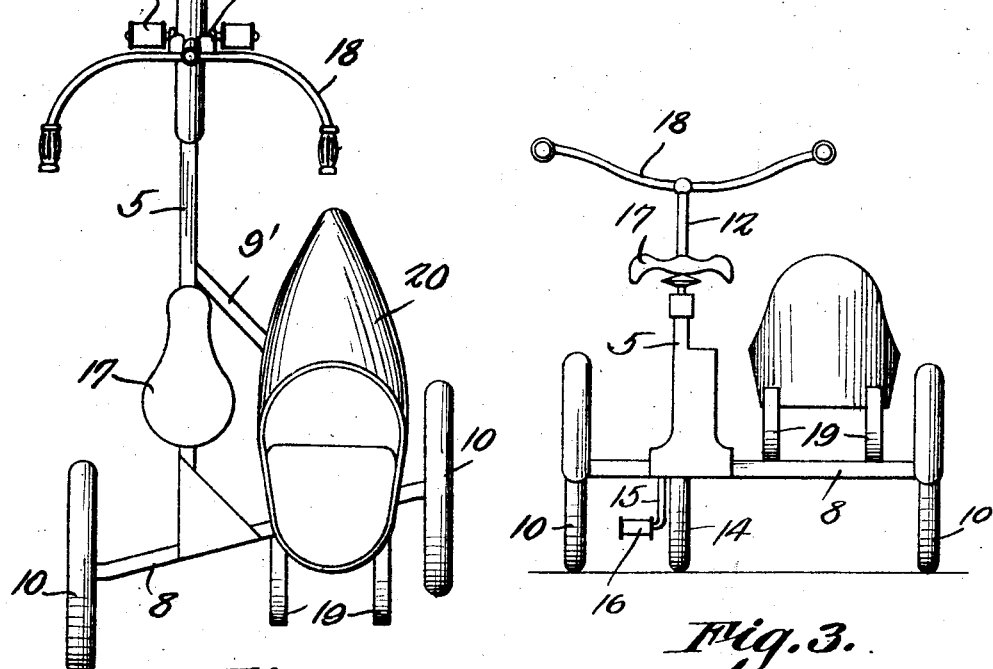
Figure 2 is a plan view thereof.
Figure 3 is a rear elevational view of the vehicle.

This main bar 5 extends laterally as at 8 and supports the axle 9 on which the wheels 10 are mounted, the lateral extension 8 and axle 9 having their ends offset as clearly shown by Figure 2 of the drawing, to the end that one of the wheels 10 operates in advance of the other wheel, increasing the speed of the vehicle, and at the same time shifting the weight supported by the vehicle, in such a way that the vehicle may not turn over in going around curves.

The reference character 9' indicates an angularly disposed bracing bar that connects with the axle adjacent to one of the ends thereof, the forward end of the bar 9' being connected with the main bar 5 as shown by Figure 2.

At the forward end of the main bar 5 is a metallic strap 11 which is secured to the sides of the bar 5 in such a way as to provide a bearing for the shaft 12 of the fork 13 of the vehicle, the fork being provided with a shaft on which the wheel 14 operates.

Pedal cranks 15 are connected with the shaft and support pedals 16 in such a way that a person positioned on the seat 17 may operate the front wheel to propel the vehicle. Handle bars 18 are secured at the upper end of the shaft 12 and afford means for moving the wheel 14 in a horizontal plane to guide the vehicle.

At the rear of the vehicle are spring members 19 that are supported on the laterally extended portion of the main bar, which spring members are secured to the carrier 20 to improve the riding qualities of the vehicle.

In the form of the invention as illustrated by Figure 7, the body portion of the vehicle is substantially flat as indicated by Figure 8 of the drawing, the body portion being indicated by the reference character 21, the forward side edges thereof being cut away to provide clearances for the legs of the operator who will position his feet on the pedals 22 that operate the front wheels 23. In this form of the invention, the rear axle indicated at 24 has offset spindles 25 on which the wheels 26 are mounted, there being provided a bar 27 cooperating with the axle 24 to provide a support for the body 28.

Figure 4:
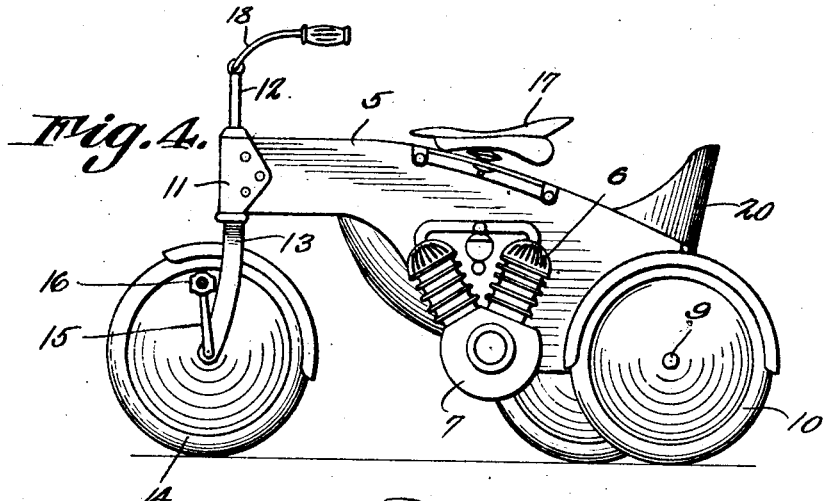
Figure 4 is an elevational view illustrating the opposite side of the vehicle.
Figure 5:
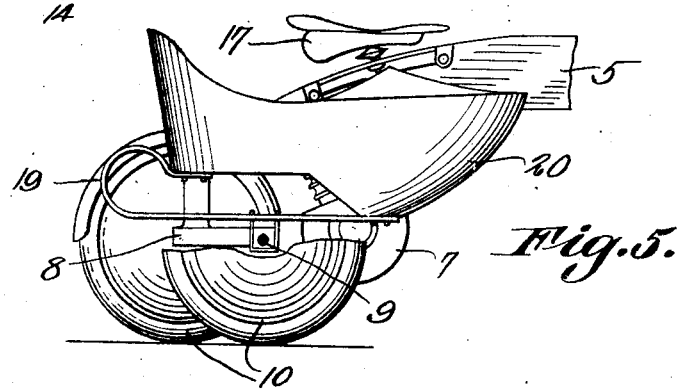
Figure 5 is a fragmental elevational view of the vehicle, the same being partly broken away.
Figure 6:
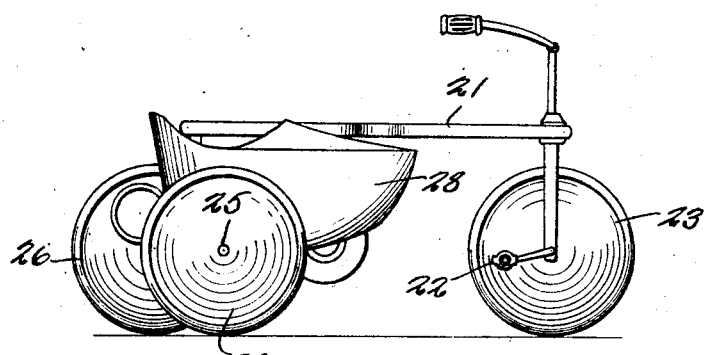
Figure 6 is a side elevational view of a modified form of the invention.

It might be further stated that it is contemplated to paint a design on the body portion of the structure as shown by Figure 4 of the drawing in such a way as to simulate a motorcycle engine, and at the same time adding to the appearance of the vehicle.

I claim:

1. In a device of the character described, a body portion, a propelling wheel at the front end of the body portion, a rear axle disposed at an oblique angle with respect to the body portion, wheels mounted at the ends of the axle, a carrier mounted laterally of the body portion and supported by the axle, and one of the wheels operating at a point to the rear of the carrier.

2. In a device of the character described, a body portion, an axle secured to the body portion adjacent to one end thereof, said axle being arranged at an oblique angle with respect to the body portion, wheels on the axle, a front propelling wheel mounted on the body portion, and an auxiliary body supported on the axle adjacent to the first mentioned body portion.

In testimony that I claim the foregoing as my own, I have hereto affixed by signature.

HAROLD C. BENNIE.